Nov. 13, 1951 W. PALMER 2,574,494
TIMING APPARATUS
Filed July 16, 1946 3 Sheets-Sheet 1

INVENTOR
WINSLOW PALMER
BY Paul B. Hunter
ATTORNEY

Nov. 13, 1951 W. PALMER 2,574,494

TIMING APPARATUS

Filed July 16, 1946 3 Sheets-Sheet 2

INVENTOR
WINSLOW PALMER
BY Paul B. Hunter
ATTORNEY

INVENTOR
WINSLOW PALMER
BY Paul B. Hunter
ATTORNEY

Patented Nov. 13, 1951 2,574,494

UNITED STATES PATENT OFFICE 2,574,494

TIMING APPARATUS

Winslow Palmer, West Hempstead, N. Y., assignor to The Sperry Corporation, a corporation of Delaware Application July 16, 1946, Serial No. 684,060

13 Claims. (Cl. 175—381)

The present invention relates generally to timing apparatus and, more particularly, to means for automatically selecting periodic pulse waves, measuring the time interval between two such selected waves and providing a continuous indication thereof which is substantially undisturbed by periodic interference or random noise.

It is common practice in prior timing apparatus to discriminate between a desired radio signal and either periodic or random interference through the employment of a local oscillator, such as a blocking oscillator or other relaxation generator, whose frequency is synchronized with the radio signal. The amplitude and shape of the output wave from such an oscillator is independent of the amplitude and shape of the incoming wave, but the frequency of the output wave is controlled by the periodic signal component of the incoming wave when this component is both adequate in amplitude and sufficiently close in frequency to the normal or free-running frequency of the local oscillator to control the same.

The free-running frequency of the local oscillator may be slower than the synchronizing wave which is injected into the oscillator circuit in such manner as to shorten the period between local oscillations. The local oscillator "locks in" or synchronizes with the desired signal at that moment when the peak of the control voltage comes just before the normal occurrence of uncontrolled relaxation and triggers the circuit.

A time delay measuring device may be connected to the output circuits of two such oscillators to indicate the time interval between the radio signals with which the respective oscillators are in synchronism. The local oscillators tend to isolate the indicating apparatus from such random noise and from interference caused by periodic signals which differ somewhat in frequency from the desired signals although not sufficiently to be eliminated by conventional filtering. A considerable improvement in selectivity is obtained by this arrangement as compared to the direct application of the incoming waves to the indicating apparatus.

These simple circuits, however, are subject to disturbances created by random noise occurring immediately before the generation of the local oscillations. Since relaxation takes place when a control potential in the oscillator circuit reaches some critical value, random noise may add to the circuit potential to exceed this critical voltage and trigger the oscillator prematurely.

Circuits have been devised to reduce these disturbances by deriving from the local oscillator exploratory pulse waves of durations short as compared to the lengths of the leading edges of the reference pulse wave signals with which the oscillator is to be synchronized. The exploratory pulse waves are employed to examine the reference waves for a brief moment during each cycle of the local oscillations and to provide generally rectangularly-shaped frequency control waves whose amplitudes are substantially proportional to the amplitudes of the reference waves at the moment they are examined. The frequency of the local oscillator is increased in accordance with the average amplitude of the frequency control waves with the result that the oscillator tends to synchronize with the reference signals.

Several advantages are achieved by this type of circuit. Only waves occurring during the generation of the sharp exploratory pulse waves contribute to the frequency control of the local oscillator. No random noise outside this short interval, irrespective of amplitude, can disturb the synchronization. The effect of random noise concurrent with the short interval when the amplitude of the reference signal is examined, is minimized by the averaging of the sampled amplitudes before controlling the frequency of the oscillator.

Such circuits have proved effective in discriminating against static and extraneous signals when synchronism has once been established. They tend, however, to be extremely slow in establishing synchronism as a result of the relatively slight effect that the individual cycles of the control wave have on the frequency of the oscillator. As has been said, the frequency of the local oscillator is adjusted to be slightly slower than the frequency of the incoming signals. Accordingly, the exploratory pulse waves reoccur at slightly greater intervals than the reference signals and drift slowly past the reference signals from their leading edges to their trailing edges and then beyond, completely out of coincidence, until a succeeding exploratory pulse wave again reaches the front edge of a subsequent reference signal. If the frequency of the oscillator is controlled by the average of the sampled amplitudes of the reference waves, then the frequency difference between the exploratory pulse waves and the reference signals must be maintained sufficiently small to permit the frequency control waves to build up to such average amplitude during the passage of the exploratory pulse waves past the reference signals that the frequency of the local oscillator synchronizes or "locks in" with the frequency of the reference signals. The less the indicating apparatus is disturbed by noise coincident with the reference signals when the system is synchronized, the greater is the required number of coincidences between the reference signals and the exploratory pulse waves before synchronism can be established.

It is highly desirable to have the unsynchronized exploratory pulse waves drift quickly relative to the incoming signals in order that the least time will elapse before synchronism is established. In certain practical applications the incoming signals occupy only a small fraction, e. g., one thousandth, of the entire repetition period, and therefore the synchronizing system must be able to stop the oscillator drift within a very few cycles of the exploratory pulse waves. The requirement that the frequency control circuit be capable of stopping drift in a few cycles is, however, incompatible with the requirement that pulses of noise coincident with the signal do not disturb synchronism. A fast acting frequency control circuit is necessarily susceptible to coincident noise, and to be free from noise disturbances the control circuit must average over many cycles the samples of the reference signal amplitude taken by the exploratory pulse waves.

It is, therefore, one of the principal objects of the present invention to provide apparatus adapted to establish synchronism between a local oscillator and a reference signal with certainty and rapidity and to maintain such synchronism with a high degree of discrimination against random noise and other interference.

Another object of the invention is to provide apparatus for accurately measuring the time interval between pulse waves having sloping wave fronts.

A further object is to provide apparatus for producing a voltage representative of the amplitude of a pulse wave signal during moments that are short as compared to the duration of the signal.

Yet another object is to provide selective pulse wave averaging apparatus for supplying individual pulse waves to a utilization circuit when the average amplitude of the pulse waves is below a predetermined minimum and for supplying a wave corresponding to the average amplitude of the pulse waves when such average is above the predetermined minimum amplitude.

A further object of the invention is to provide improved apparatus and instrumentalities embodying novel features and principles, adapted for use in realizing the above objects and also adapted for use in other fields.

The invention in another of its aspects relates to novel features of the instrumentalities described herein for achieving the principal objects of the invention and to novel principles employed in those instrumentalities, whether or not these features and principles are used for the said principal objects or in the said field.

Other objects of the invention will become more apparent as the description proceeds.

In the drawings,

Figs. 3A to 3F are a series of graphs illustrating idealized shapes of waves associated with the operation of the apparatus shown in Figs. 1 and 2.

Figures 1, 2:
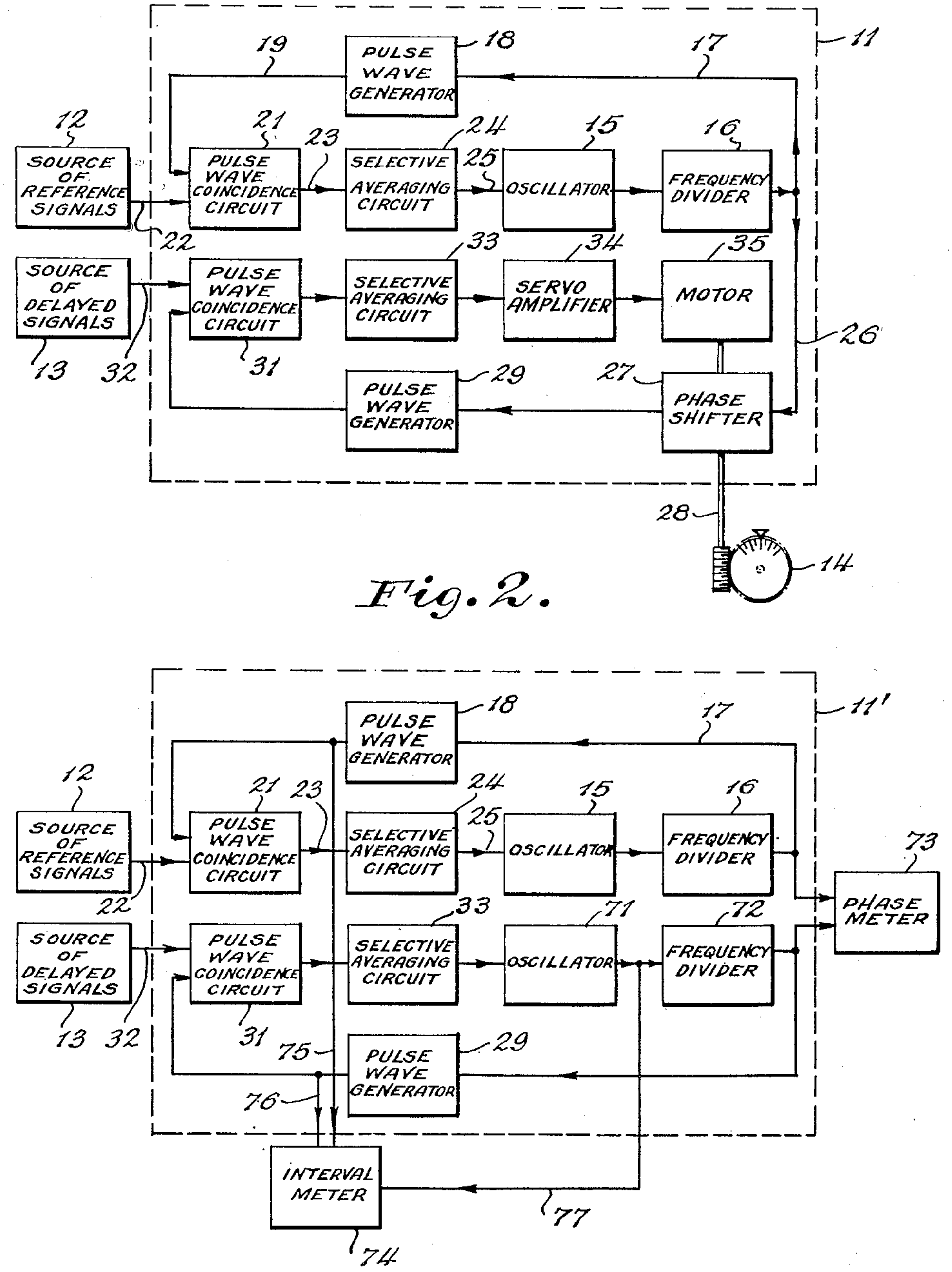
Fig. 1 is a block diagram of one form of timing apparatus embodying the present invention.
Fig. 2 is a block diagram of an alternate form of the invention.

Referring now to Fig. 1, there is shown an automatic timing apparatus 11 adapted to determine the time interval between pulse waves issuing at the same repetition rate from sources 12 and 13 of reference and delayed signals, respectively. A continuous reading of the recurrent interval between these signals is provided by an indicator 14.

Timing apparatus 11 employs a relatively high frequency oscillator 15 as a timing standard. A frequency divider 16 is connected to oscillator 15 and is adapted to reduce the generated frequency to approximately the periodicity of the reference and delayed signals. The relatively low frequency waves from divider 16 are supplied over a lead 17 to a pulse wave generator 18.

Figure 7:
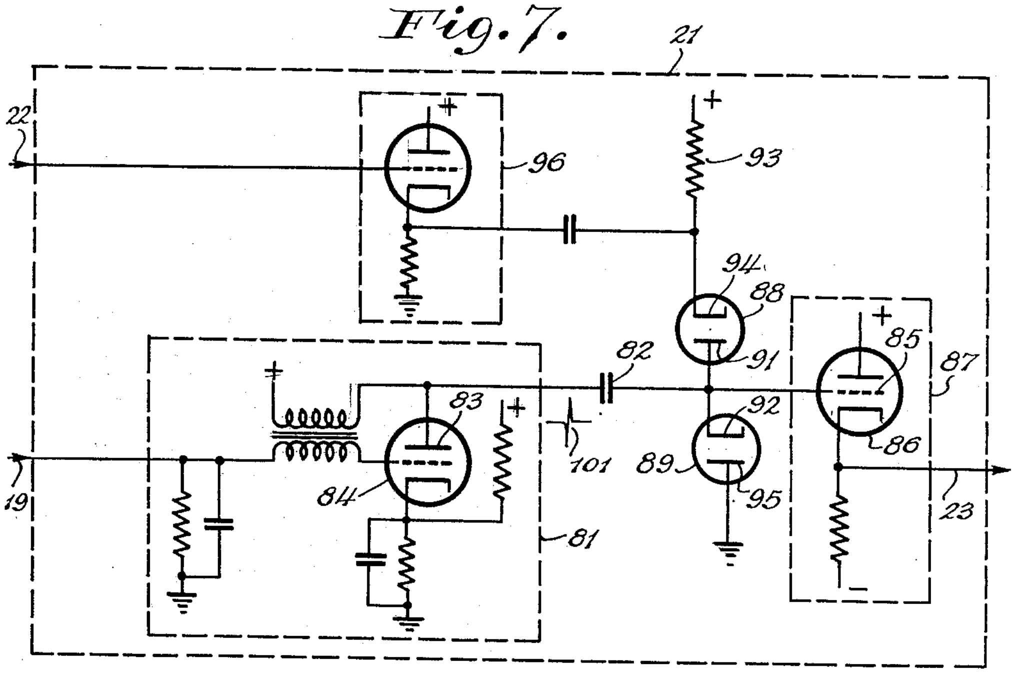
Fig. 7 is a wiring schematic diagram of a pulse wave coincidence circuit suitable for use in the structures of Figs. 1 and 2.

The generator 18 is adapted to produce trigger pulse waves in response to the waves from frequency divider 16. The trigger waves are applied by means of a lead 19 to a pulse wave coincidence circuit 21 to which is also supplied the reference signals over a lead 22. Pulse wave coincidence circuit 21, described in more detail with reference to Fig. 7, is adapted to produce a generally rectangularly-shaped frequency control wave whose amplitude is substantially proportional to the amplitude of any wave applied over lead 22 at the moment the circuit is triggered by generator 18. Coincidence circuit 21 thus samples the amplitude of the reference signal, and each cycle of the frequency control waves has an amplitude corresponding to the instant amplitude when the signal applied over lead 22 is momentarily examined. The frequency control waves are supplied from coincidence circuit 21 over a lead 23 to a selective averaging circuit 24.

The averaging circuit 24, described in more detail with reference to Fig. 8, comprises a first conductive path for normally interconnecting the coincidence circuit 21 to a lead 25 which lead is connected to a frequency control circuit in the oscillator 15. Averaging circuit 24 also has an alternative conductive path which includes an amplitude averaging filter circuit. This second path is normally ineffectual and is rendered operative in response to an average amplitude of the frequency control waves above some predetermined minimum in such manner as to disable the normal conductive path. The action of the selective averaging circuit 24 is therefore to permit the frequency control circuit of oscillator 15 to respond to individual frequency control waves when oscillator 15 is not synchronized with the source of reference signals 12 and yet automatically insert means for averaging the frequency control waves when synchronism has been established in order to maintain this condition with a high degree of discrimination against random noise and other interference.

The frequency divider 16 is also connected by a lead 26 to a phase shifter 27 which is adapted to introduce a phase shift in the applied waves in accordance with the angular position of a shaft 28 which is mechanically coupled to the indicator 14. The phase-shifted waves from phase shifter 27 are applied to a pulse wave generator 29 which is similar to generator 18. The trigger waves from generator 29 are fed to a coincidence circuit 31 corresponding to coincidence circuit 21. Delayed signals are also supplied to circuit 31 over a lead 32 from the source 13. The amplitudes of the delayed signals are examined at the periodicity of the trigger waves issuing from the generator 29, and control waves having amplitudes in accordance with the instant amplitudes of the waves impressed on lead 32 are fed to a selective averaging circuit 33 which is similar to circuit 24. The selectively averaged control waves from circuit 33 are supplied to a servo amplifier 34. Amplifier 34 energizes a motor 35 which actuates the shaft 28 of the phase shifter 27 through appropriate gearing (not shown).

Figures 3, 4, 5, 6:
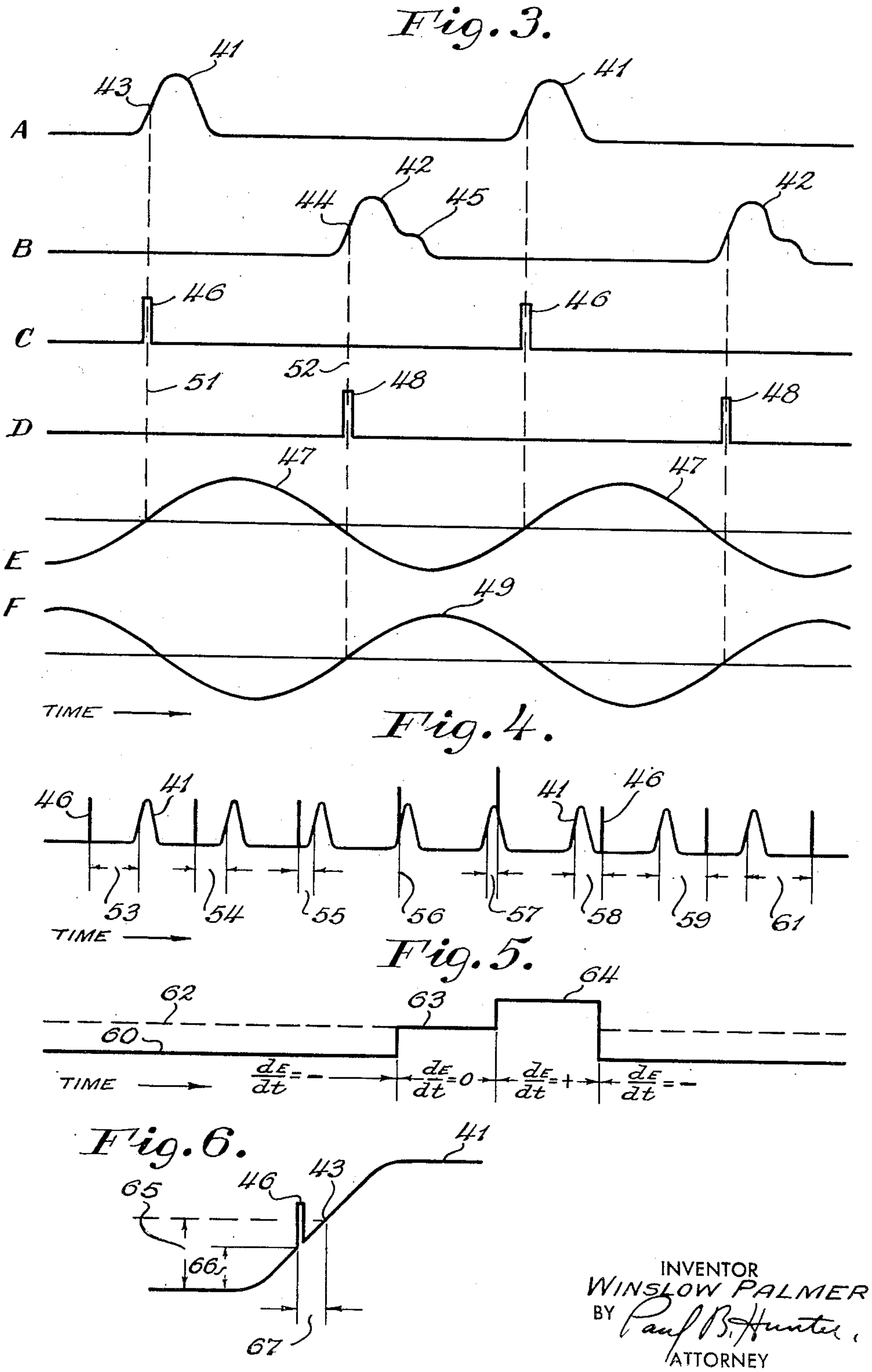
Fig. 4 is a graph illustrating the relationship between reference pulse waves and exploratory pulse waves.
Fig. 5 is a graph illustrating the frequency control voltage developed as a result of the relationship between the pulse waves shown in Fig. 4.
Fig. 6 is a detail of the sloping wave front of a pulse wave signal when the exploratory pulse wave is near synchronism.

The operation of the apparatus of Fig. 1 may best be described with reference to Figs. 3 through 6. Pulse waves 41 in Fig. 3A represent reference signals issuing from the source 12 while pulse waves 42 in Fig. 3B illustrate delayed signals applied to the timing apparatus 11 from source 13. It is the purpose of the apparatus to measure the time interval between these periodic waves, and this is achieved by determining the interval between corresponding portions of the waves such as points 43 and 44 on the leading edges thereof.

According to the present invention, lack of similarity in the pulse shapes subsequent to the leading edges is immaterial. Irregularities in the trailing edge such as indcated at 45 in the wave 42 of Fig. 3B introduce no inaccuracies. These dissimilarities between reference and delayed signals 41 and 42 often occur when the pulses have been radiated from distant and separate transmitters and are propagated over several propagation paths of different time delays and attenuations, for example, ground wave and sky wave paths.

Pulse waves 46 shown in Fig. 3C represent the trigger waves provided by generator 18 in response to wave 47 shown in Fig. 3E issuing from the frequency divider 16. Pulse waves 48 shown in Fig. 3D represent the trigger waves created by pulse wave generator 29 in response to phase-shifted wave 49 illustrated in Fig. 3F fed from the phase shifter 27.

When the pulse waves 46 and 48 coincide with similar portions of the wave fronts of pulse wave signals 41 and 42, respectively, the phase shift of the wave 49 with respect to the wave 47, as indicated by the indicator 14, represents the unknown periodic interval between the delayed signals and the reference signals. This interval is indicated graphically as the space between the dashed lines 51 and 52.

Until the synchronous condition represented by Fig. 3 has been established, the oscillator 15 operates at a frequency such that the trigger pulse waves 46 from generator 18 occur at a slightly slower rate than do the reference signals 41.

Fig. 4 represents the time relationship between the trigger pulse waves 46 and the reference signals 41 that would obtain if the lead 25 between the selective averaging circuit 24 and the frequency controlling portion of the oscillator 15 were disconnected. It is seen that the pulse waves 46 are generated at longer intervals than the reference signals 41 and therefore tend to overtake the latter. The spaces 53, 54 and 55 represent progressively decreasing intervals between the two waves while the particular trigger pulse wave indicated at 56 is in coincidence with the leading edge of the reference signal. After the coincidence the succeeding trigger waves occur in progressively increasing lagging relationship to the nearest reference signal as shown by the spaces 57, 58, 59 and 61.

Fig. 5 illustrates the frequency control waves generated in response to each of the trigger waves represented in Fig. 4. The horizontal dashed line 62 indicates that amplitude of the frequency control wave which is necessary in order to increase the frequency of oscillator 15 by an amount sufficient to reduce the frequency of the trigger pulse waves derived therefrom to zero drift with respect to the reference signals. In Fig. 5 it is observed that the frequency control waves have a constant minimum or reference amplitude 60 when the trigger pulse waves 46 occur in the absence of a reference signal. When, however, the trigger pulse wave 46 is generated in coincidence with that portion 43 of the leading edge at which it is desired to synchronize the oscillator 15, the momentary amplitude of the reference signal is such as to result in a corresponding frequency control wave amplitude indicated by the wave portion 63 in Fig. 5. This amplitude remains substantially constant until the next trigger pulse wave is generated. If, for some reason, the wave 46 occurs at a time when the amplitude of the reference signal is greater than at the desired coincidence point 43, then a frequency control wave having an amplitude such as shown by the wave portion 64 will be produced. A further displacement of the wave 46 from the predetermined coincidence point 43 will cause them to reoccur after the lagging edge of the reference signals and the amplitude of the frequency control waves will again return to its constant minimum value.

The frequency difference between waves 41 and 46, shown in Fig. 6, may be considered to be a time rate of change of relative phase. The frequency of wave 46 changes in proportion to the amplitude of the frequency control wave which in turn is substantially proportional to the amplitude 66 of wave 41 at the instant the wave 46 occurs. The time rate of change of relative phase is, consequently, roughly proportional to the difference between the amplitude 65 of the wave 41 at the desired coincidence point 43 and the instant amplitude. The phase or time displacement 67 between the pulse wave 46 and the point 43 is approximately proportional to the difference between the amplitude 65 and the amplitude 66 at some other point on the leading edge of the wave 41. Accordingly, the action of the timing apparatus 11 is to make the relative phase of the waves 41 and 46 change at a rate proportional to their relative phase displacement. It is well known that a system having such an operational characteristic tends to reduce the relative phase error to zero.

When the trigger pulse wave 46 occurs to the right or later than the point 43 on wave 41 and yet when the amplitude of the latter wave still exceeds the amplitude at the predetermined point 43 of synchronism, a frequency control wave will be generated having an amplitude in excess of that necessary to increase the frequency of the oscillator 15 to zero relative drift. Frequency control waves of such amplitude tend to cause the pulse waves 46 to occur at shorter intervals or more rapidly than the reference signals. Thus whenever a trigger pulse wave occurs between the beginning of the reference signal and that point on the lagging edge thereof where the amplitude is reduced to equality with the amplitude of the wave at coincidence, there is generated a satisfactory frequency control signal for causing the succeeding trigger pulse waves to be rapidly and smoothly brought to the coincidence point.

Referring now to Fig. 2, there is shown a modified form of timing apparatus 11' wherein the servo amplifier 34, motor 35, and phase shifter 27 are replaced by an oscillator 71 similar to oscillator 15 and a frequency divider 72 corresponding to divider 16. The delayed signals are here synchronized in a manner substantially identical to that employed to synchronize the reference signals. A phase meter 73 may be provided to measure the phase angle between the waves issuing from frequency dividers 16 and 72. Alternatively, an interval meter 74 may be employed of the type shown in application Ser. No. 543,034, entitled Electronic Timing Apparatus, filed June 30, 1944, in the name of David E. Kenyon, and now U. S. Patent No. 2,414,107, issued January 14, 1947.

The interval meter 74 is adapted to measure the interval between trigger pulse waves generated by generators 18 and 29 and fed over leads 75 and 76, respectively, in terms of the frequency standard of oscillator 71 as provided to the interval meter by a lead 77.

Referring now to Fig. 7, there is illustrated a possible embodiment of the pulse wave coindence circuit 21 shown in Fig. 1. A quiescent blocking oscillator 81 is adapted to be triggered by pulse waves applied over the lead 19 from the pulse wave generator 18. A charge-collecting capacitor 82 couples the anode 83 of blocking oscillator tube 84 to the grid 85 of an electron tube 86 in a cathode follower circuit 87. The side of capacitor 82 adjacent grid 85 is connected between two diode rectifiers 88 and 89 arranged in series. The anode 91 of diode 88 and the cathode 92 of diode 89 have a common junction with grid 85. A positive source of voltage is applied through a load resistor 93 to the cathode 94 of diode 88, and the anode 95 of diode 89 is connected to ground with the result that a bias potential is applied to the discharge devices 88 and 89 having a polarity tending to oppose current flow therethrough. Thus a charge on the capacitor 82 is electrically isolated over a range of voltage from that of the ground potential on anode 95 to the positive potential applied to cathode 94.

A cathode follower circuit 96 impresses on the load resistor 93 a version of the reference signals applied over lead 22. The potential on cathode 94 is thus proportional to the sum of a constant bias potential and the momentary amplitude of the reference signal.

In the operation of the form of the pulse wave coincidence circuit 21 shown in Fig. 7, the blocking oscillator 81 produces a single exploratory pulse wave when triggered by the pulse wave applied to its grid circuit by means of lead 19. This pulse wave has a characteristic wave shape 101 sweeping first downwards to some minimum anode voltage then upwards to some maximum anode voltage and returning to its intermediate quiescent value. Assuming a condition of no net charge and with the blocking oscillator 81 blocked, capacitor 82 charges through the diode 88 to the difference of potential between its cathode 94 and the anode 83 of the tube 84. When the voltage between grid 85 and ground equals the voltage between cathode 94 and ground, the anode 91 is at the same potential as cathode 94, and no further current can flow through diode 88.

At the beginning of the downward swing of the blocking oscillator pulse wave 101, the charge on capacitor 82 cannot change because the voltage on grid 85 is driven less positive than the potential on cathode 94 and yet still remains more positive than the ground potential of anode 95 of diode 89. Thus no current can flow through the diodes to alter the charge on capacitor 82. The decreasing anode potential of the blocking oscillator 81 forces the voltage on grid 85 downwards until as a result of the algebraic sum of the anode potential and the voltage drop across capacitor 82 the grid voltage reaches zero. As the blocking oscillator anode potential continues to decrease, the voltage on grid 85 tends to go negative with respect to ground but is prevented from so doing by current flow through diode 89 which acts to discharge capacitor 82. The capacitor 82 discharges until the lower swing of the blocking oscillator pulse wave 101 reaches a minimum value. Since the voltage on grid 85 must remain at zero during this process, the voltage drop across the capacitor 82 is reduced to this minimum anode potential.

As the blocking oscillator pulse wave 101 returns from its lower excursion, the charge on capacitor 82 again cannot change since the voltage on grid 85 passes through values intermediate between zero and the positive potential on cathode 94. The voltage on grid 85 therefore rises until it equals the amplitude of this cathode potential. Any tendency for a further rise of the voltage on grid 85 in response to the rising anode potential of the blocking oscillator 81 is prevented by flow of current through diode 88 recharging the capacitor 82. Capacitor 82 continues to charge until the upward excursion of the blocking oscillator pulse wave 101 reaches its maximum value. Since the voltage on grid 85 cannot exceed the momentary potential on cathode 94 the charge on capacitor 82 increases until the voltage drop across the capacitor is equal to the difference between the maximum anode potential at the upper extremity of the blocking oscillator pulse wave excursion and the instantaneous potential on cathode 94.

When the blocking oscillator pulse wave returns to its quiescent value this charge on capacitor 82 remains unchanged and the potential on grid 85 is reduced to a value equal to the difference between the instantaneous potential on cathode 94 and the upward excursion of the blocking oscillator pulse wave. The amplitude of the upper excursion of the blocking oscillator wave is constant as is the positive direct voltage bias on cathode 94; consequently the potential to which the grid 85 is returned is proportional to the amplitude of the version of the reference signal which is applied to the cathode 94 by the cathode follower 96. Since this potential is always less positive than that on cathode 94 and more positive than ground, the charge on capacitor 82 cannot change until the recurrence of another blocking oscillator pulse wave. The voltage on the grid 85 is therefore constant over the entire period between trigger pulse waves and the cathode follower 87 reproduces this control voltage at a low impedance for supplying to the frequency control circuit of the local oscillator 15.

It is to be noted that the constant positive bias voltage on cathode 94 must be greater than the minimum anode potential at the lowest extremity of the blocking oscillator pulse wave and must also be greater than the amplitude of the upper excursion of this wave, that is, greater than the difference between the maximum blocking oscillator anode potential and its quiescent value. Irrespective of the voltage drop across capacitor 82 resulting from a prior examination of the reference signal amplitude by the exploratory pulse wave, the capacitor 82 is discharged on the lower swing of the blocking oscillator pulse wave to some minimum reference value which is equal to or less than the charge left on the capacitor 82 after the upper swing of the blocking oscillator pulse wave has taken place.

Figure 8:
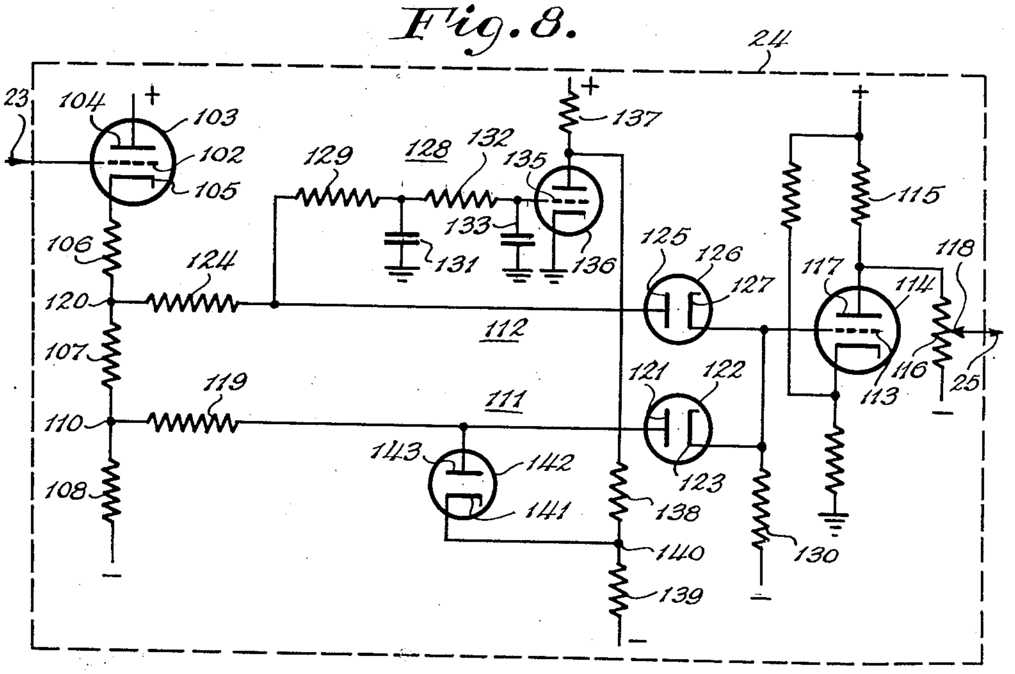
Fig. 8 is a wiring schematic diagram of a selective averaging circuit suitable for use in the structures of Figs. 1 and 2.

Referring now to Fig. 8 there is illustrated in detail a possible form of the selective averaging circuit 24 represented by a block in the structure of Fig. 1. The frequency control waves from the pulse wave coincidence circuit 21 are applied over lead 23 to the grid 102 of an electron tube 103 which is adapted to operate as a cathode follower. For this purpose the anode 104 of tube 103 is supplied directly by a positive source of potential while its cathode 105 is connected to a negative voltage source by means of a cathode load comprising a series combination of resistors 106, 107 and 108.

The cathode load of tube 103 is coupled through alternative conductive paths 111 and 112 to the grid 113 of a direct voltage amplifier tube 114. Tube 114 has an anode load resistor 115 on which a version of the voltage applied to its grid appears. A coupling resistor 116 in the form of a voltage divider is connected between the anode 117 of tube 114 and a source of negative potential. The lead 25 which connects the selective averaging circuit 24 with the frequency control circuit in the oscillator 15 is attached to an adjustable contact 118 which may be positioned on the resistor 116 at a point of zero or other predetermined potential with respect to ground to obtain a desired frequency control bias when the oscillator 15 is not synchronized and the exploratory pulse waves generated in the pulse wave coincidence circuit 21 are not coincident with the reference signals.

Conductive path 111 coupling the cathode load of tube 103 to the grid 113 of the amplifier tube 114 comprises a resistor 119 of high resistance, say 5 megohms, one end of which is attached to the junction 110 of cathode resistors 107 and 108. The other end of resistor 119 is connected to the anode 121 of a diode 122 whose cathode 123 is attached to the grid 113.

The alternative conductive path 112 comprises a resistor 124 similar to resistor 119 but connected to a more positive point on the cathode load of tube cathode follower 103. Specifically one end of resistor 124 is attached to the junction 120 of resistors 106 and 107 while the other end of resistor 124 is connected to the anode 125 of a diode 126 whose cathode 127 is attached to the grid 113 of amplifier tube 114 in a similar manner as is diode 122. A filter circuit 128 is coupled to the conductive path 112 at the anode 125 of the diode 126.

Filter circuit 128 comprises a relatively large condenser 131 connected to the anode 125 in diode tube 126 through resistor 129. The resistor 129 is small compared with resistor 124, so that variations in potential of anode 125 of tube 126 respond only slowly with variations in potential at point 120. A further resistor 132 is connected in series with the resistor 129 and has its other side shunted by a capacitor 133. The grid 135 of an amplifier tube 136 is connected to the high potential side of the capacitor 133 in order that the voltage drop through an anode load resistor 137 of tube 136 will vary in accordance with the average amplitude of the voltage impressed on the conductive path 112. The load resistor 137 is connected in series with resistors 138 and 139 between positive and negative sources of potential. The variation in the voltage drop through resistor 137 caused by change in conduction of tube 136 alters the potential present at the junction 140 between resistors 138 and 139. The cathode 141 of diode 142 is connected to junction point 140 and the anode 143 of diode 142 is attached to the conductive path 111 at the anode 121 of diode 122.

As will be discussed hereinafter, the conductive path 111 normally couples the cathode follower tube 103 to the amplifier tube 114 whenever swings of potential at point 110 are more positive than the potential on condenser 131. The path 112 including the amplitude averaging filter 128 is normally ineffectual. The tube 136 together with the diode 142 and other associated circuit elements provides a means which is responsive to an average amplitude of the waves applied over lead 23 above some predeterminable minimum for disconnecting the conductive path 111 and for coupling tubes 103 and 114 only through the amplitude averaging path 112.

In the operation of the selective averaging circuit 24 illustrated in Fig. 8, direct voltage amplifier tube 114 is controlled by the signal impressed upon its grid 113 through the series combination of resistor 119 and diode 122 which acts to couple the cathode follower tube 103 to the tube 114 for positive swings of potential greater than the potential of the filter condenser 131 when the exploratory pulse wave is not in coincidence with the reference pulse wave signal. Under conditions of noncoincidence of these pulse waves, and before synchronism of the local oscillator 15 is established, junction point 120 is maintained at a sufficiently negative potential so that the voltage on grid 135 of tube 136 is below conduction cutoff. In the absence of current flow through tube 136, the junction point 140 to which the cathode 141 of diode 142 is connected is maintained at a sufficiently positive potential to prevent diode 142 from conducting.

A positive signal impressed over lead 23 on the grid 102 of tube 103 causes junction points 110 and 120 in the cathode load to become less negative. Current flows through diode 122 and is impressed across grid resistor 130 increasing the grid voltage and causing a drop in the voltage across anode load resistor 115. A negative voltage is coupled by means of resistor 116 to the output lead 25 which is attached to the frequency control circuit of the local oscillator 15.

The potentials across capacitors 131 and 133 do not change immediately. The capacitor 131 charges through resistors 124 and 129 until the potential on anode 125 of diode 126 exceeds that on anode 121 of diode 122. This will inevitably occur if several successive pulse waves are applied to lead 23, indicative of coincidence between the reference signal and the exploratory pulse wave since junction point 120 is always at a more positive direct potential than junction point 110 in the cathode load of tube 103. Capacitor 133 shunting grid 135 of tube 136 to ground, also charges but more slowly than capacitor 131 since it is charged by the latter through high value resistor 132.

Tube 136 is caused to conduct by the positive potential applied to its grid 135 when the reference signal and exploratory pulse waves are in coincidence. Current flow through tube 136 creates a voltage drop in its load resistor 137 which results in a negative potential at junction 140 to which cathode 141 of diode 142 is attached. The negative cathode potential in diode 142 permits this tube to conduct. Since the anode 143 of diode 142 is connected to the corresponding electrode 121 of diode 122, the potential on anode 121 is drawn down to a negative value such that no possible negative noise pulse at junction 110 can cause diode 122 to conduct and alter the voltage applied to grid 113 of the direct voltage amplifier 114.

The conductive path 111 is thus effectually disconnected and all control of tube 114 is transferred to the conductive path 112. The filter network 128 included in path 112 introduces a large time constant therein. The potential on anode 125 of diode 126 can only change slowly, averaging many cycles of the incoming signals and gives operation, once synchronism has been established, that is substantially free of noise disturbances.

The frequency control wave as modified by the selective averaging circuit 24 varies the time rate of change of the phase of the waves produced by the oscillator 15 in accordance with the variation in amplitude of the reference pulse wave signal, as momentarily examined by the exploratory pulse waves. The addition in the electronic follow-up system of what amounts to an integrating circuit, as represented by the capacitor 131 and resistor 128, tends to make the control system oscillatory and the resistor 129 is added to dampen any tendency to oscillate.

Control waves applied over lead 23 which represent coincidence of exploratory pulse waves with random noise cannot bring about a change in the coupling circuits from path 111 to path 112 since random noise lacks the repetitive characteristic necessary to permit capacitor 133 to charge to the critical switching potential. When the local oscillator 15 is not in synchronism the effect of random noise is to cause the frequency of the oscillator 15 to drift irregularly. The coincidence of an intense noise pulse with the exploratory pulse wave may even momentarily produce a frequency drift tending to prevent synchronism. However, the time required for a synchronizing cycle, that is, from loss of synchronism to the reestablishment of a coincident relationship between the reference signals and the exploratory pulse waves, is roughly inversely proportional to the ratio of the signal to random noise intensities. The necessary time for synchronism is approximately the same as if an amount of amplitude averaging were employed dependent upon the intensity of noise present. However, if an amplitude average were continuously used to control the frequency drift of the oscillator 15, the relationship between the speed of frequency drift and the contribution of individual cycles of the frequency control wave would be such as to permit the exploratory pulse waves to pass through coincidence with reference signals without building up a sufficient frequency control bias to lock the oscillator 15 in synchronism.

Since many changes could be made in the above constructions and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for timing the interval between periodic reference and delayed pulse wave signals comprising a source of reference signals and a source of delayed signals, a first wave-generating means for generating a first synchronizing wave at a frequency normally lower than that of said signals, means fed from said first generating means and connected to receive the reference signal for producing a frequency control wave having an amplitude dependent upon the amplitude of said reference signal when said first synchronizing wave is generated, means connected to be controlled by said control wave for increasing the frequency of said first synchronizing wave in response to the amplitude of said control wave whereby to maintain said first synchronizing wave in coincidence with said reference signal, a second wave-generating means for generating a second synchronizing wave normally delayed with respect to said first synchronizing wave, means fed from said second generating means and connected to receive the delayed signal for producing a second frequency control wave having an amplitude dependent upon the amplitude of the delayed signal when said second synchronizing wave is generated, means connected to be controlled by said second control wave for decreasing the delay of said second synchronizing wave in response to the amplitude of said second frequency control wave whereby to maintain said second synchronizing wave in coincidence with the delayed signal, and means for measuring the time interval between said first synchronizing wave and the delayed second synchronizing wave.

2. In apparatus for timing the interval between periodic reference and delayed pulse wave signals, a source of reference signals and a source of delayed signals, a first wave-generating means for generating a periodic reference synchronizing pulse wave at a frequency normally lower than that of said signals, means fed from said first generating means and connected to receive the reference signal for producing a frequency control wave having an amplitude dependent upon the amplitude of the reference signal at the instant the synchronizing pulse wave occurs, means connected to be controlled by said control wave for increasing the frequency of said synchronizing pulse wave in response to the control wave amplitude to maintain the reference synchronizing pulse wave in coincidence with the reference signal, a second wave-generating means for supplying a second synchronizing pulse wave normally delayed with respect to the reference synchronizing pulse wave, means fed from said second generating means and connected to receive the delayed signal for producing a second control wave having an amplitude dependent upon the amplitude of the delayed signal at the instant the second synchronizing pulse wave occurs, and means for decreasing the time delay of the second synchronizing pulse wave in accordance with the amplitude of the second control wave to maintain the second synchronizing pulse wave in coincidence with the delayed signal.

3. Apparatus for timing the interval between periodic reference and delayed pulse wave signals comprising a source of reference signals and a source of delayed signals, a first wave-generating means for generating a first synchronizing pulse wave at a frequency normally lower than that of said signals, means fed from said first generating means and connected to receive the reference signal for producing a first frequency control wave having an amplitude dependent upon the amplitude of said reference signal when said first synchronizing wave is generated, means connected to be controlled by said first frequency control wave for increasing the frequency of said first synchronizing wave in response to the amplitude of said first frequency control wave to synchronize said first synchronizing wave with said reference signal, a second wave-generating means for generating a second synchronizing pulse wave at a frequency normally lower than that of said signals, means fed from said second generating means and connected to receive the delayed signal for producing a second frequency control wave having an amplitude dependent upon the amplitude of said delayed signal when said second synchronizing pulse wave is generated, means connected to be controlled by said second control wave for increasing the frequency of said second synchronizing wave in response to the amplitude of said second frequency control wave to synchronize said second synchronizing wave with said delayed signal and means for measuring the time interval between said first synchronizing wave and the delayed second synchronizing wave.

4. Apparatus for timing the interval between periodic reference and delayed pulse wave signals comprising a source of reference signals and a source of delayed signals, a first wave-generating means for generating a first synchronizing pulse wave at a frequency normally lower than that of said signals, means fed from said first generating means and connected to receive the reference signal for producing a first frequency control wave having an amplitude dependent upon the amplitude of said reference signal when said first synchronizing wave is generated, means connected to be controlled by said first control wave for increasing the frequency of said first synchronizing wave in response to the amplitude of said first frequency control wave to synchronize said first synchronizing wave with said reference signal, a second wave-generating means for generating a second synchronizing wave normally progressively retarded with respect to said first synchronizing wave for effecting momentary synchronism between said second synchronizing wave and said delayed signal, means fed from said second generating means and connected to receive the delayed signal for producing a retardation control wave having an amplitude dependent upon the amplitude of said delayed signal when said second synchronizing wave is generated, means connected to be controlled by said retardation control wave for decreasing the progressive retardation of said second synchronizing wave in accordance with the amplitude of said retardation control wave to maintain synchronism between said second synchronizing wave and said delayed signal, and means operable with said last mentioned means for measuring the time difference between the first and second waves.

5. In timing apparatus, the combination comprising a source of reference signals, an oscillator which is to be synchronized with reference pulse wave signals having sloping leading edges, means energized by said oscillator for deriving exploratory pulse waves of short duration as compared with the duration of said leading edges, means fed from said first-mentioned means and connected to receive the reference signal for producing periodically recurring control waves which have amplitudes dependent upon the amplitudes of said reference signals during the occurrences of said exploratory pulse waves, means connected to be controlled by said control waves for controlling the frequency of said oscillator in accordance with the amplitude of each of said control waves to establish synchronism with said reference signals, and means connected to be controlled by said control waves for controlling the frequency of said oscillator in accordance with the average amplitude of said control waves once synchronism is established to maintain the same.

6. In timing apparatus, the combination comprising a source of reference signals, an oscillator which is to be synchronized with reference pulse wave signals having a relatively slowly rising wave front, means energized by said oscillator for deriving pulse waves of short duration as compared with the duration of said wave front, the uncontrolled frequency of said oscillator being such that said pulse waves are created at a recurrence rate slower than that of said reference signals, means fed from said first-mentioned means and connected to receive the reference signal for sampling the amplitudes of said reference signals during the occurrences of said pulse waves to produce control waves having amplitudes dependent upon the momentary amplitudes of said reference signals, and means connected to be controlled by said control waves for increasing the frequency of said oscillator in accordance with the individual amplitude of each of said control waves in succession whereby said oscillator tends to synchronize with said reference signals, and means connected to receive said control waves for maintaining the frequency of said oscillator synchronized in response to the average amplitude of said control waves.

7. In timing apparatus, the combination comprising a source of reference signals, an oscillator which is to be synchronized with reference pulse wave signals having sloping leading edges, means energized by said oscillator for deriving exploratory pulse waves of short duration as compared with the duration of said leading edges, means fed from said first-mentioned means and connected to receive the reference signal for producing periodically recurring control waves which have amplitudes dependent upon the amplitudes of said reference signals during the occurrences of said exploratory pulse waves and durations substantially equal to the periods between said exploratory pulse waves, means connected to be controlled by said control wave for successively controlling the frequency of said oscillator in accordance with the amplitude of each of said control waves to establish synchronism with said reference signals, signal-averaging means, and means connected to said averaging means and responsive to an average amplitude of said control waves above a predetermined minimum for rendering the frequency of said oscillator responsive only to the average amplitude of said control waves to maintain synchronism of said oscillator with said reference signals.

8. In timing apparatus, the combination comprising a source of reference signals, an oscillator which is to be synchronized with reference pulse wave signals having a relatively slowly rising wave front, means energized by said oscillator for deriving pulse waves of short duration as compared with the duration of said wave front, the uncontrolled frequency of said oscillator being such that said pulse waves are created at a recurrence rate slower than that of said reference signals, means fed from said first-mentioned means and connected to receive the reference signal for sampling the amplitudes of said reference signals during the occurrences of said pulse waves to produce control waves having amplitudes dependent upon the momentary amplitudes of said reference signals and durations substantially equal to the periods between the derived pulse waves, means connected to be controlled by said control waves for increasing the frequency of said oscillator in accordance with the individual amplitude of each of said control waves in succession whereby said oscillator tends to synchronize with said reference signals, signal-averaging means, and means connected to said averaging means and responsive to an average amplitude of said control waves exceeding a predetermined minimum for maintaining the frequency of said oscillator synchronized in accordance with the average amplitude of said control waves.

9. In timing apparatus, the combination comprising a source of reference signals, an oscillator which is to be synchronized with reference pulse wave signals having sloping leading edges, means energized by said oscillator for deriving exploratory pulse waves of duration short as compared to the duration of said leading edges, means fed from said first-mentioned means and connected to receive the reference signal for producing periodic control waves having amplitudes dependent upon the amplitudes of said reference signals during the occurrence of said exploratory pulse waves, a first frequency control means connected to be controlled by said control waves for controlling the frequency of said oscillator in accordance with the individual amplitude of each of said control waves in succession, a second frequency control means including averaging means connected to receive said control waves for controlling the frequency of said oscillator in accordance with the average amplitude of said control waves, said second control means being normally ineffectual, and means connected to said averaging means and responsive to at least a predetermined average amplitude of said control waves for disabling said first frequency control means and rendering said second frequency control means effective.

10. In timing apparatus, the combination comprising a source of reference signals, an oscillator which is to be synchronized with reference pulse wave signals having sloping leading edges, means energized by said oscillator for deriving exploratory pulse waves of short duration as compared with the duration of said leading edges, means fed from said first-mentioned means and connected to receive the reference signal for generating successive control waves each having an amplitude determined by the amplitude of said reference signals at the moment each exploratory wave is derived, means for supplying said control waves to said oscillator to control the frequency of said oscillator in accordance with the amplitude of said control waves, means for averaging said control waves, and means connected with said averaging means and responsive to the average amplitude of said control waves above a predetermined minimum for effecting a frequency control of said oscillator substantially solely in accordance with the average amplitude of said control waves.

11. In wave synchronizing apparatus for synchronizing an oscillator output with a periodically recurring reference wave, means energized by said oscillator for producing a pulse of shorter duration than said reference wave, means connected to receive said pulse and the reference wave for producing a first control wave having an amplitude dependent upon the amplitude of said reference wave when said pulse occurs, said first control wave being supplied to control said oscillator, averaging means connected to receive said first control wave and adapted to supply a second control wave proportional to the average amplitude of the first control wave, said second control wave being supplied to control said oscillator, and means connected to receive said second control wave for blocking the supply of the first control wave to said oscillator when said second control wave attains a predetermined minimum value.

12. In timing apparatus for determining the relative phase of two periodically recurring waves having generally sloping, leading and trailing edges, wave-generating means including an oscillator to be synchronized with one of said waves, means energized by said oscillator for producing a pip-like pulse of appreciably shorter duration than said one wave such that it may occur at discrete points along the sloping edge of said one wave, and means connected to receive said pulse and said one wave for producing a control wave having an amplitude dependent upon the amplitude of said one wave when said pulse occurs, said control wave being supplied to control said wave-generating means whereby to synchronize the frequency of its output with said one wave.

13. In timing apparatus for determining the relative phase of two periodically recurring waves having generally sloping, leading and trailing edges, wave-generating means including an oscillator to be synchronized with one of said waves, means energized by said oscillator for producing a pip-like pulse of appreciably shorter duration than said one wave such that it may occur at discrete points along the sloping edge of said one wave, means connected to receive said pulse and said one wave for producing a control wave having an amplitude dependent upon the amplitude of said one wave when said pulse occurs, said control wave being supplied to control said wave-generating means whereby to synchronize the frequency of its output with said one wave, means connected to receive said control wave for averaging the amplitudes of the control wave, and means for supplying the average wave when it attains a predetermined minimum value to control said wave-generating means.

WINSLOW PALMER.

REFERENCES CITED

The following references are of record in the file of this patent:

UNITED STATES PATENTS

| Number | Name | Date |
|---|---|---|
| 2,029,069 | Hallowell | Jan. 28, 1936 |
| 2,211,942 | White | Aug. 20, 1940 |
| 2,406,316 | Blumlein et al. | Aug. 27, 1946 |
| 2,418,364 | Moe | Apr. 1, 1947 |
| 2,426,216 | Hight | Aug. 26, 1947 |
| 2,426,910 | Wilson | Sept. 2, 1947 |
| 2,427,029 | Stearns | Sept. 9, 1947 |
| 2,476,409 | Free | July 19, 1949 |